(12) United States Patent
Abe

(10) Patent No.: US 6,685,217 B2
(45) Date of Patent: Feb. 3, 2004

(54) LEG PROTECTION DEVICE FOR VEHICLE OCCUPANTS

(75) Inventor: Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/142,900

(22) Filed: May 13, 2002

(65) Prior Publication Data

US 2002/0171232 A1 Nov. 21, 2002

(30) Foreign Application Priority Data

| May 21, 2001 | (JP) | ................................. | 2001-151165 |
| Oct. 18, 2001 | (JP) | ................................. | 2001-320680 |
| Nov. 26, 2001 | (JP) | ................................. | 2001-359689 |
| Mar. 8, 2002 | (JP) | ................................. | 2002-063991 |

(51) Int. Cl.⁷ ............................................. B60R 21/22
(52) U.S. Cl. ..................... 280/730.1; 280/743.2; 280/729
(58) Field of Search ...................... 280/730.1, 729, 280/743.2

(56) References Cited

U.S. PATENT DOCUMENTS

| 3,731,949 A | * | 5/1973 | Radke ...................... 280/743.1 |
| 5,312,131 A | | 5/1994 | Kitagawa et al. |
| 5,588,672 A | * | 12/1996 | Karlow et al. ........... 280/730.2 |
| 5,884,937 A | * | 3/1999 | Yamada ................... 280/730.2 |
| 6,155,595 A | | 12/2000 | Schultz |

FOREIGN PATENT DOCUMENTS

| DE | 199 34 245 | 2/2001 |
| DE | 199 46 477 | 3/2001 |
| GB | 2 263 671 | 8/1993 |
| JP | 47-24110 | 7/1972 |
| JP | 5-208646 | 8/1993 |
| JP | 5-208653 | 8/1993 |
| JP | 5-213144 | 8/1993 |
| WO | 00/12359 | 3/2000 |
| WO | 02/04262 | 1/2002 |

* cited by examiner

Primary Examiner—Charles T. Jordan
Assistant Examiner—Bret Hayes
(74) Attorney, Agent, or Firm—Kanesaka & Takeuchi

(57) ABSTRACT

A leg protection device for protecting legs of a vehicle occupant from colliding against a vehicle member in front of the vehicle occupant includes an airbag installed inside the vehicle member and a gas generator for generating gas to inflate the airbag. The airbag has a first chamber having a first gas inlet and a second chamber having a second gas inlet. The airbag expands along the vehicle member when the airbag is inflated. The first chamber and the second chamber are connected so that the gas generated from the gas generator at first passes through the first chamber, then flows into the second chamber.

12 Claims, 14 Drawing Sheets

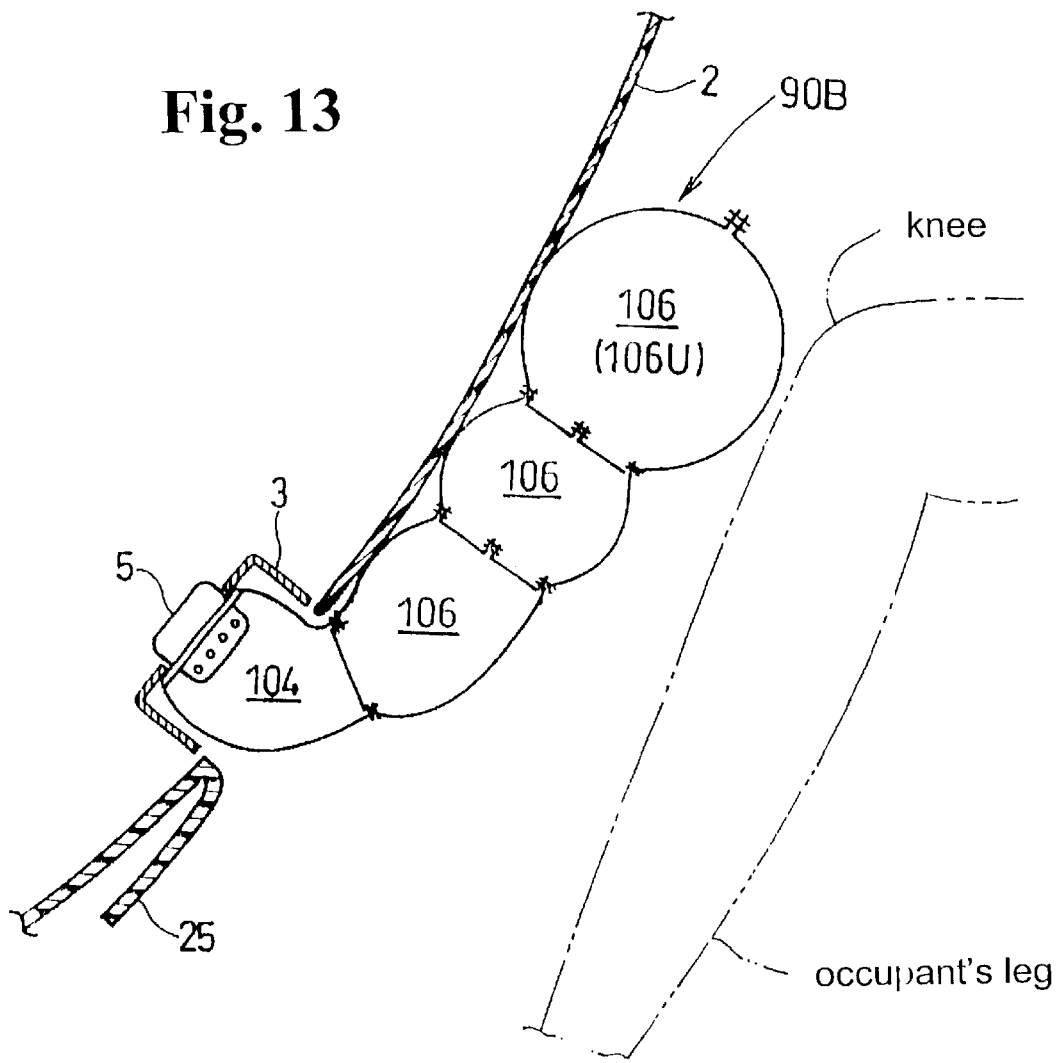

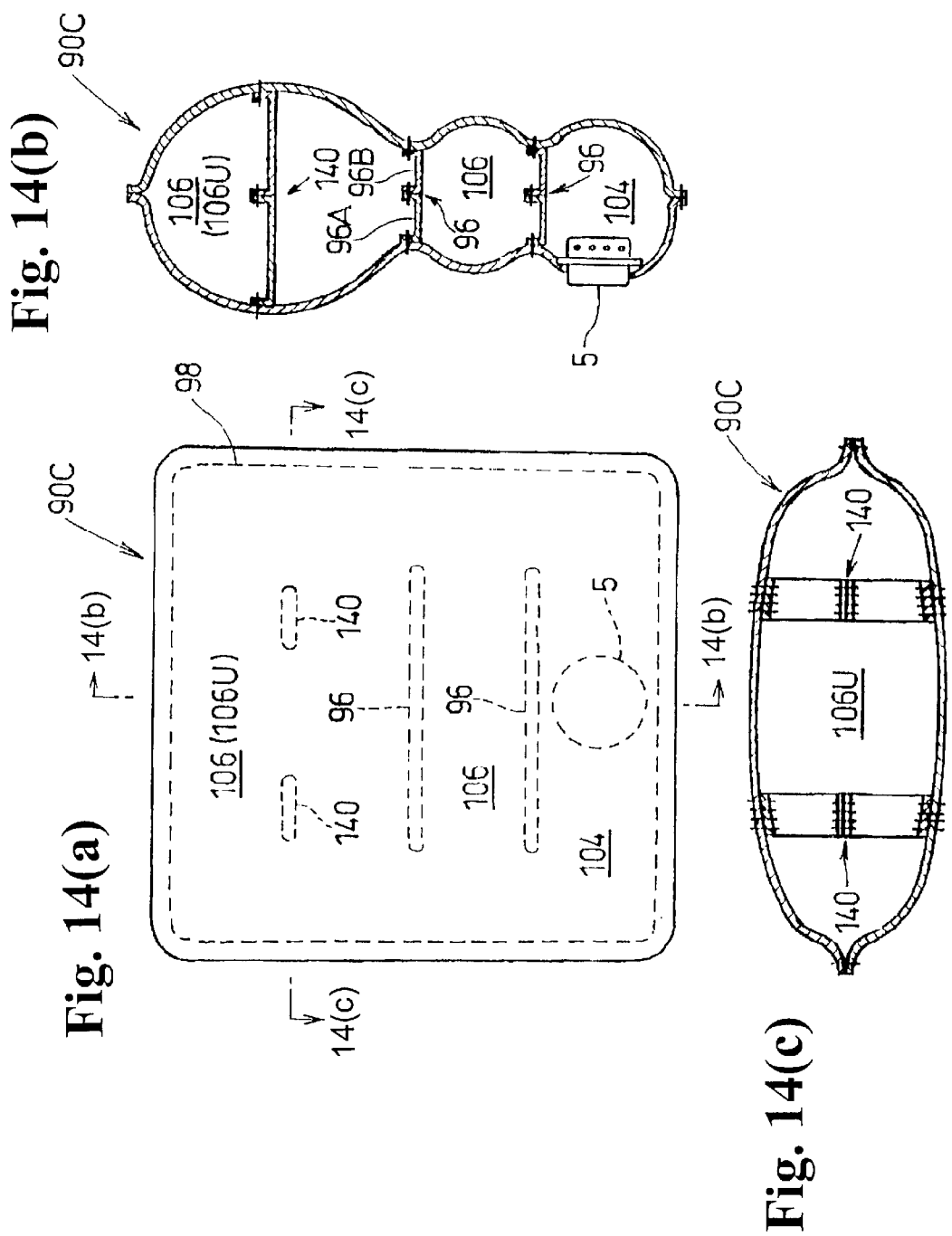

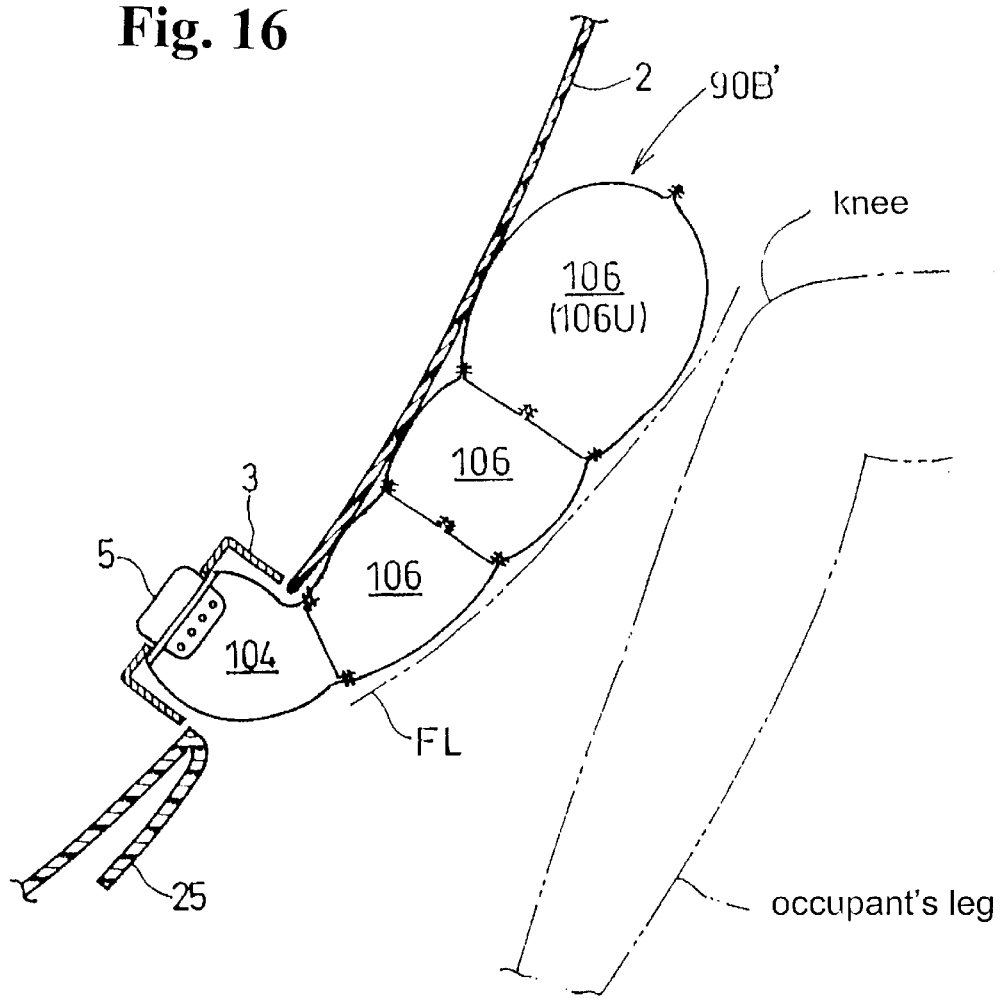

LEG PROTECTION DEVICE FOR VEHICLE OCCUPANTS

BACKGROUND OF THE INVENTION AND RELATED ART STATEMENT

The present invention relates to a leg protection device having an airbag for protecting occupant's legs in a vehicle from a collision with an object such as an interior panel in front of a seat in the event of a vehicle collision, and particularly directed to a leg protection device having an airbag provided therein with a plurality of chambers.

In a conventional leg protection device having an airbag inflated in front of the vehicle occupant to receive the legs in the event of a vehicle collision so as to protect the vehicle occupant, a single chamber is normally formed inside the airbag without partition as disclosed in Japanese Utility Model Publication (KOKOKU) No. 47-24110, Japanese Patent Unexamined Publication No. 05-208646, Japanese Patent Unexamined Publication No. 05-208653, and Japanese Patent Unexamined Publication No.05-213144.

The occupant sitting on a vehicle seat may assume various sitting postures, for example, with knees apart and/or with legs extending sideways. The positions of the knees may be often spaced apart from a center of the seat. Therefore, the airbag of the leg protection device is preferably designed to rapidly spread in the vehicle lateral direction after start of inflation. In addition, in order to prevent the occupant's legs from colliding with any vehicle members in front of the vehicle seat when the legs plunge into the inflated airbag, the airbag is desired to securely receive and stop the occupant's legs.

In the conventional leg protection device having an airbag with a single chamber therein, since a dimension of the inflated airbag in a vehicle longitudinal direction (hereinafter, sometimes referred to as "a thickness of an airbag) tends to be large, sufficient inflation of the airbag with a large thickness can receive the occupant's legs effectively. However, if the airbag having the single chamber therein is designed to expand laterally as well, a volume of the inflated airbag becomes so large that a gas generator is required to have significantly large generating capacity.

It is an object of the present invention to provide a leg protection device for the vehicle occupant, in which the airbag can be rapidly and widely expanded along a device in front of the vehicle seat even with the gas generator having a small generating capacity.

It is another object of the present invention is to provide the leg protection device for the vehicle occupant that can sufficiently receive and stop the occupant's legs even with the airbag having a smaller thickness when inflated.

Further objects and advantages of the invention will be apparent from the following description of the invention.

SUMMARY OF THE INVENTION

A leg protection device for a vehicle occupant according to the present invention includes an airbag installed in a vehicle member in front of a vehicle seat and a gas generator for inflating the airbag. The leg protection device has a feature in that the airbag is provided with a first chamber into which gas from the gas generator is first introduced, and a second chamber into which the gas passing through the first chamber is introduced. The first chamber and the second chamber are arranged to extend along the vehicle member when the airbag is inflated.

In the leg protection device of the present invention, when the gas generator is actuated to spout out gas in the event of a vehicle collision, first the gas flows into the first chamber and successively flows from the first chamber to the second chamber, thereby inflating the first chamber and the second chamber. In this case, since the airbag is deployed to extend along the vehicle member in front of the vehicle seat, the projection of the airbag from the vehicle member in a longitudinal direction of the vehicle is small, whereby a wider area of the airbag protects the occupant's legs. In the present invention, an inlet of the second chamber may be narrowed. Because of the narrowed inlet of the second chamber, the gas in the second chamber hardly flows back to the first chamber when the occupant's leg plunges into the second chamber. Accordingly, the leg can be received and stopped effectively by the second chamber.

Since both of the first and second chambers are designed to be deployed to extend along the vehicle member in front of the vehicle seat, an area of the airbag facing the occupant is large upon inflation, thereby being able to receive the occupant's legs regardless of the leg positions.

In the present invention, the airbag has a front panel arranged to face the occupant and a rear panel arranged to face the vehicle member. It is preferable that the inside of the airbag is divided into the first chamber and the second chamber by a linear joint portion connecting the front panel and the rear panel. According to this structure, the thickness of the airbag upon inflation is limited to be small, whereby the airbag can be rapidly inflated even with the gas generator having small generating capacity.

Further in the present invention, it is also preferable that the inside of the airbag is divided into the first chamber and the second chamber by a partition panel connecting the front panel and the rear panel.

According to this structure, the thickness and a configuration of the airbag upon inflation can be adjusted at higher degree of freedom by changing a size and shape of the partition panel (for example, the length of the partition panel in a direction of connecting the front panel and the rear panel). When compared to the case where the front panel and the rear panel are connected to each other directly by a linear joint, stresses, which is applied to portions connecting the front panel and the rear panel to the partition panel when the inner pressure of the airbag is increased, are dispersed entirely over the connected portion and the partition panel, so the stress can be limited to be smaller. Accordingly, material of relatively low strength can be used for the respective panels, and sewing yarns or adhesives of relatively low strength can be used for the connected portions, thereby reducing the cost.

In the present invention, the second chamber extends in such a way that the gas can enter through its inlet to flow straight therein, thereby facilitating the inflation of the second chamber. In this case, the second chamber may be provided at its inlet with a partition extending in a direction perpendicular to the longitudinal direction of the second chamber in order to narrow a width of the inlet, thereby securely preventing the gas from flowing back from the second chamber.

In the present invention, the airbag may be provided with a plurality of second chambers, and at least one of the second chambers has a different size from that of the other second chamber. According to this structure, the leg protection device can be designed according to a design of the vehicle, a profile of the instrument panel and a layout of the seat. For example, in the case of the second chamber to be inflated in a small space between the vehicle member and the legs, the leg protection device is designed such that the thickness of the second chamber is small upon inflation. In the case of the second chamber to be inflated in a large space between the vehicle member and the legs, the leg protection device is designed such that the thickness of the second chamber is large upon inflation.

In the present invention, at least a part of the first chamber may extend substantially in a vertical direction of the airbag, and a plurality of the second chambers may extend substantially in a lateral direction. According to this leg protection device, the gas is dispersed or supplied from the first chamber to a plurality of the second chambers, thereby uniformly inflating the second chambers. Since the second chambers extend in the lateral direction, the occupant's legs can be securely received and stopped by the second chambers even when the occupant's legs are spaced apart from a center of the vehicle seat.

In the present invention, the airbag may further include a third chamber into which the gas passing through the second chamber is introduced and the inlet of the third chamber may be narrowed. Because of the narrowed inlet of the third chamber, the gas in the third chamber hardly flows back to the second chamber when the occupant's leg plunges into the third chamber. Accordingly, the leg can be received and stopped effectively by the third chamber. Also in this case, by designing the second and third chambers to extend substantially in the lateral direction, the occupant's legs can be securely received by the airbag regardless of the leg positions.

In the present invention, a chamber to receive the knees of the occupant is designed to have a larger thickness than those of the other chambers upon inflation, thereby effectively absorbing an impact on the knees and the thigh joints.

To make the thickness of the chamber for receiving the occupant's knees larger than those of the other chambers, the chamber deploying in front of the knees of the occupant is designed to have a larger thickness than that of the other chambers.

To make the thickness of the chamber for receiving the occupant's knees larger than those of the other chambers in the leg protection device of the present invention in which at least a part of the first chamber extends substantially in the vertical direction of the airbag and a plurality of the second chambers extend substantially in the lateral direction, one of the second chambers is located at the top of the airbag and this uppermost second chamber has a larger thickness than those of the other chambers, and the uppermost second chamber is to be deployed in front of the knees of the vehicle occupant.

BRIEF DESCRIPTION OF THE DRAWINGS

FIG. 13 is a sectional view showing the airbag in FIGS. 12(a) and 12(b) in its inflated state;

FIG. 14(a) is a front view of a still further embodiment of the invention; FIG. 14(b) is a sectional view taken along line 14(b)—14(b) in FIG. 14(a); and FIG. 14(c) is a sectional view taken along line 14(c)—14(c) in FIG. 14(a);

FIG. 16 is a view showing an airbag according to another embodiment; and

DETAILED DESCRIPTION OF PREFERRED EMBODIMENTS

Figure 1:
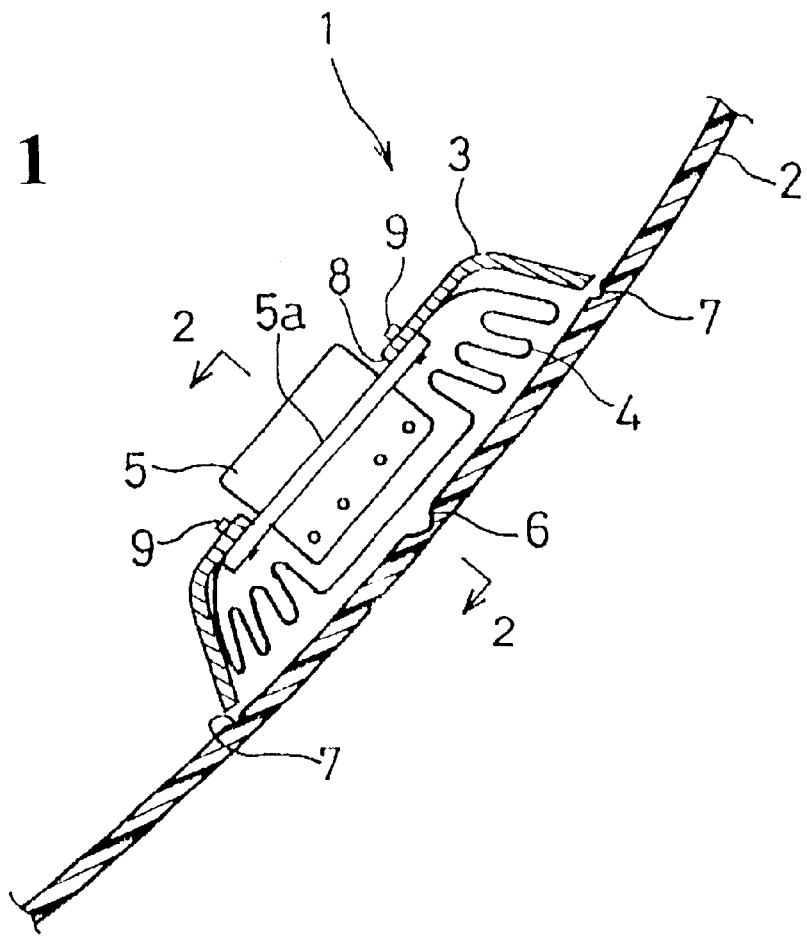
FIG. 1 is a vertical sectional view showing a leg protection device according to an embodiment.
Figure 2:
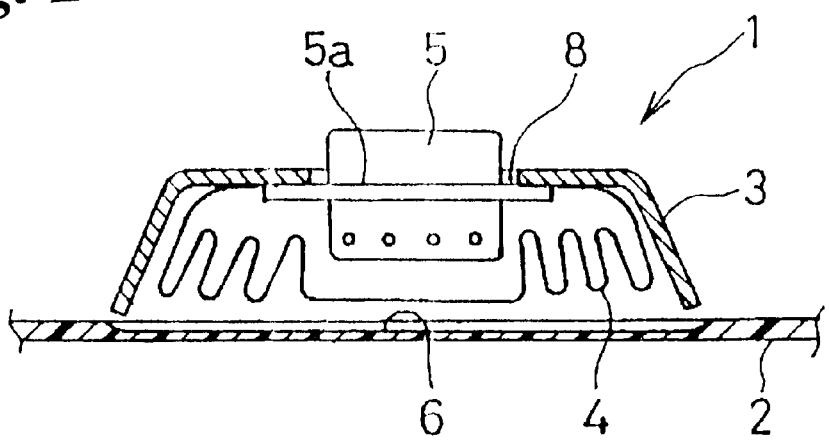
FIG. 2 is a sectional view taken along a line 2—2 in FIG. 1.
Figure 3:
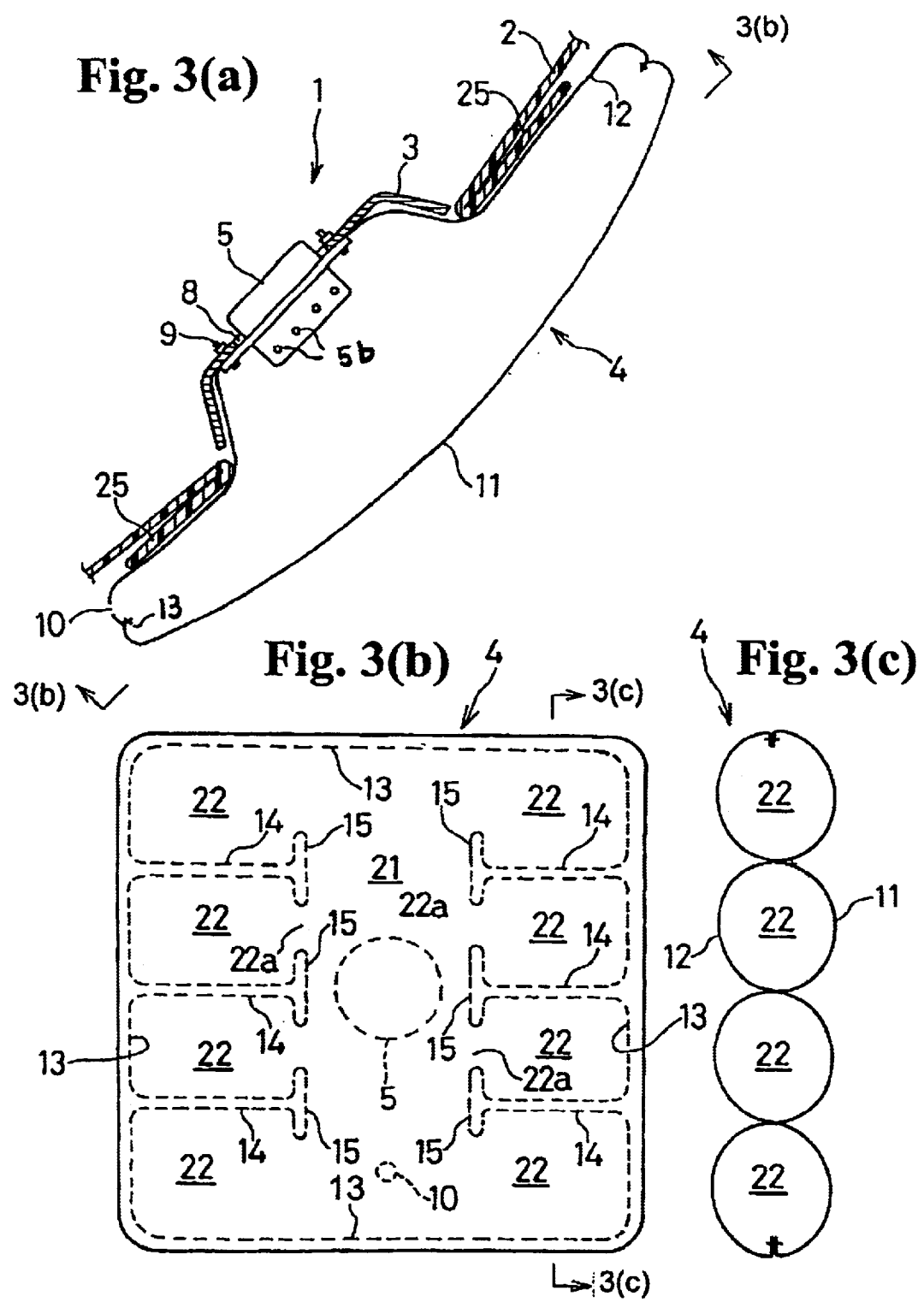
FIG. 3(a) is a vertical sectional view of the leg protection device when an airbag thereof is inflated.
FIG. 3(b) is a view in a direction from arrows 3(b)—3(b) in FIG. 3(a)
FIG. 3(c) is a sectional view taken along line 3(c)—3(c) in FIG. 3(b)

Hereunder, preferred embodiments of the present invention will be explained with reference to the accompanied drawings. FIG. 1 is a vertical sectional view showing a leg protection device according to an embodiment; FIG. 2 is a sectional view taken along line 2—2 of FIG. 1; FIG. 3(a) is a vertical sectional view of the leg protection device when an airbag is inflated; FIG. 3(b) is a view as seen in a direction of arrows 3(b)—3(b) of FIG. 3(a); and FIG. 3(c) is a sectional view taken along line 3(c)—3(c) of FIG. 3(b).

A leg protection device 1 is installed in an interior panel 2 in front of a front passenger seat of a vehicle. The interior panel 2 is disposed below an instrument panel. The leg protection device 1 is arranged substantially at the same level as a seating surface of the front passenger seat.

The leg protection device 1 comprises a casing 3 disposed on a rear surface of the interior panel 2, a folded airbag 4 accommodated in the casing 3, and a gas generator 5 for inflating the airbag 4. The casing 3 has an opening at its front and is disposed such that the interior panel 2 covers this front opening. The interior panel 2 is provided with tear lines 6 and hinge lines 7, allowing the interior panel 2 to be torn along the tear lines 6 and to be bent at the hinge lines 7 during the inflation of the airbag 4. Both the tear lines 6 and the hinge lines 7 are composed of grooves formed in the interior panel 2.

The gas generator 5 has a flange 5a projecting from the side periphery thereof. An edge around a gas inlet of the airbag 4 is sandwiched between the flange 5a and the casing 3. The casing 3 has an opening 8 through which the gas generator 5 is inserted. The flange 5a is fixed to the edge around the opening 8 by bolts 9. The casing 3 is fixed to a vehicle member via a bracket (not shown).

As shown in FIG. 3(a), in this embodiment, the airbag 4 is composed of a front panel 11 facing the occupant and a rear panel 12 at a backside. The rear panel 12 is provided with an insertion hole (no numeral) for the gas generator 5 and a vent hole 10 formed therein.

These panels 11, 12 are joined along their peripheries to make them into an envelope shape. Numeral 13 designates a joint line for the joint along their peripheries.

A plurality (in this embodiment, six in total) of joint lines 14 extends from the peripheral joint line 13. Each joint line 14 is a linear sewn portion rectilinearly extending substantially in the lateral direction in a state that the airbag 4 is inflated. The joint lines 14 are continuously connected at their distal ends to the joint line 13. By the joint lines 14, eight second chambers 22 are defined inside the airbag 4.

Disposed at the proximal ends of the joint lines 14 are partitions 15 extending vertically both upward and downward, whereby inlets 22a of the second chambers 22 are narrowed. The second chambers 22 are arranged at left and right sides of the airbag 4 in four stages in the vertical direction.

Arranged at a center in a lateral direction of the airbag 4 is a first chamber 21. The first chamber 21 extends from the upper end to the lower end. The gas generator 5 is located at the center in the vertical direction of the first chamber 21.

When the vehicle equipped with the leg protection device having the aforementioned structure comes into a frontal collision, the gas generator 5 is actuated to spout out gas through gas ports 5b so as to initiate the inflation of the airbag 4.

The gas from the gas generator 5 first flows into the first chamber 21 so that the first chamber 21 starts to inflate. Subsequently, the gas in the first chamber 21 flows through the inlets 22a to inflate the second chambers 22.

Along with the initiation of inflation of the airbag 4, the interior panel 2 is pressed by the airbag 4 and is torn along the tear lines 6, forming flaps 25. The flaps 25 are bent at the hinge lines 7. Upon opening the flaps 25, the airbag 4 is expanded into a vehicle cabin and is deployed along the front surface of the interior panel 2.

The inflated airbag 4 receives and stops the plunging legs of the occupant. As the legs plunge into the airbag 4, the internal pressure of the airbag 4 is increased so that a part of the gas flows out through the vent hole 10, thereby absorbing the impact.

In the leg protection device 1, the inside of the airbag 4 is divided into the first chamber 21 and the second chambers 22. Upon initiation of the device, the first chamber 21 first starts to inflate. At this point, nearly entire gas pressure is applied to the first chamber 21 so that the first chamber 21 is rapidly inflated. As the first chamber 21 is inflated, the gas is distributed from the first chamber 21 substantially uniformly into the respective second chambers 22, whereby the respective second chambers 22 are substantially uniformly inflated in the lateral direction along the interior panel 2.

Since the joint lines 14 defining the second chambers 22 extend rectilinearly, the gas flowing into the second chambers 22 through the inlets 22a flows just straight forward, thereby rapidly inflating the second chambers 22.

Since the front panel 11 and the rear panel 12 of the airbag 4 are connected by the joint lines 14 and the partitions 15, the thickness of the airbag 4 is kept small even when the airbag 4 is fully inflated. Therefore, the airbag 4 can be rapidly inflated with none or little interference of the occupant's legs even though a space between the occupant's legs and the interior panel 2 is small. When the legs plunge into the inflated airbag 4, the internal pressure of the chamber 21 or 22 onto which the legs plunge is increased.

Since the increase in the internal pressure is large as compared to that of the conventional example having an airbag with a single chamber, the occupant's legs can be effectively received and stopped. Particularly because of the narrowed inlets 22a of the second chambers 22, the gas in the second chambers 22 hardly flows back to the first chamber 21. Accordingly, the impact absorption on the leg received by the second chamber 22 can be extremely sufficient.

FIG. 4 through FIG. 9 is a front view showing airbags according to different embodiments, respectively.

Figure 4:
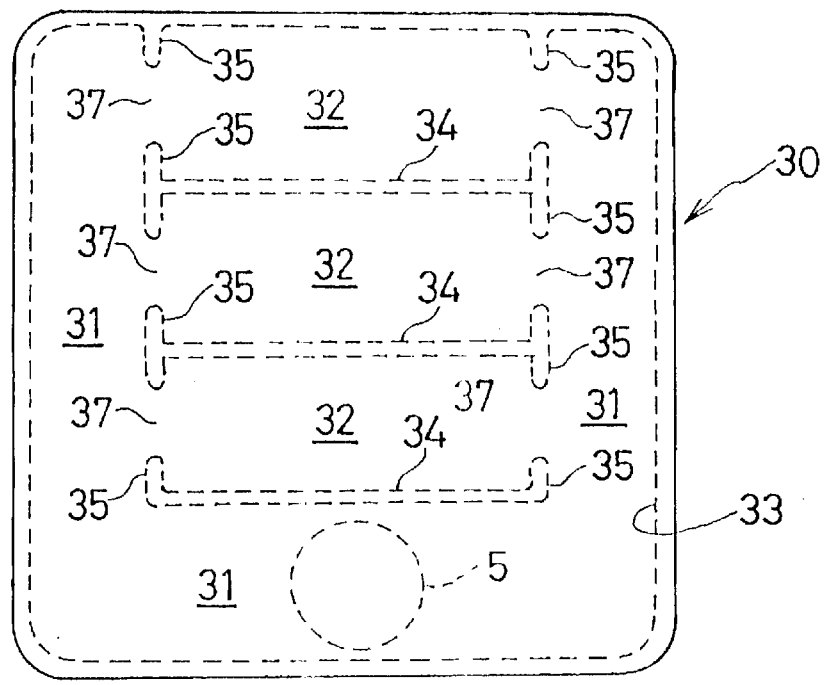
FIG. 4 is a front view of an airbag according to another embodiment.

An airbag 30 shown in FIG. 4 has a first chamber 31 formed in a U-shape extending along lower, left and right side edges of the airbag. The gas generator 5 is located at a center portion along the lower edge of the first chamber 31. Second chambers 32 extend in a lateral direction. Each second chamber 32 has gas inlets 37 at both lateral ends. Numeral 33 designates a joint line along a peripheral edge of the panels, numeral 34 designates joint lines as linear sewn portions for defining the second chambers 32, and numeral 35 designates partitions for narrowing the inlets 37.

Figure 5:
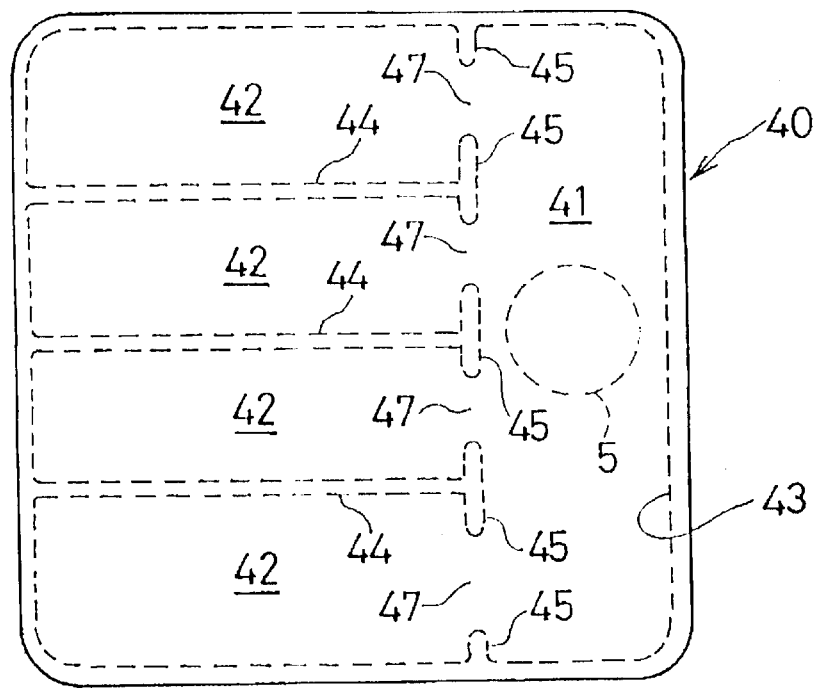
FIG. 5 is a front view of an airbag according to another embodiment.

An airbag 40 shown in FIG. 5 has a first chamber 41, extending vertically along the right-side edge of the airbag, and second chambers 42, communicating with the first chamber 41 through gas inlets 47 which are formed at the right end sides of the second chambers 42, respectively. The gas generator 5 is located at the center in the vertical direction of the first chamber 41. Numeral 43 designates a joint line along the peripheral edge of the panels, 44 designates joint lines as linear sewn portions for defining the second chambers 42, and 45 designates partitions for narrowing the gas inlets 47.

Figure 6:
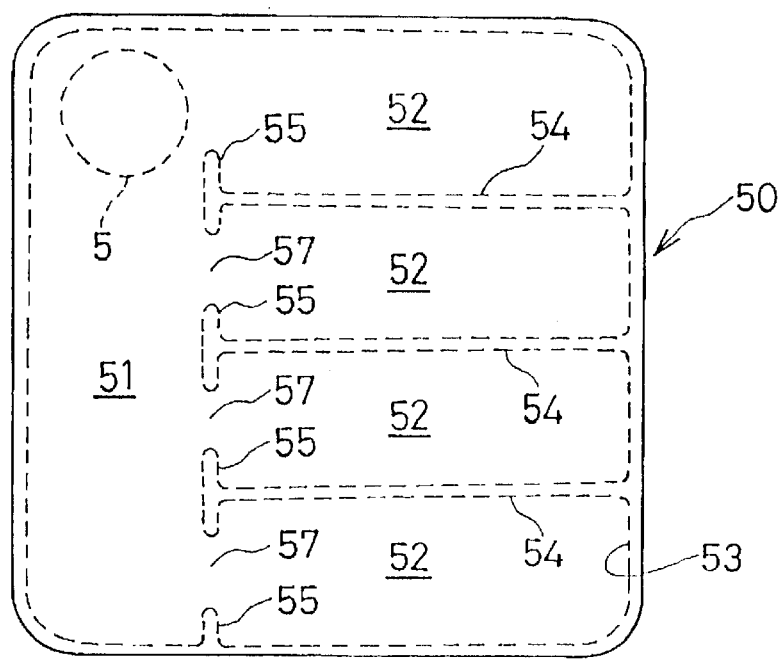
FIG. 6 is a front view of an airbag according to another embodiment.

An airbag 50 shown in FIG. 6 has a first chamber 51, extending vertically along the left side edge of the airbag, and second chambers 52, communicating with the first chamber 51 through gas inlets 57 formed at the left end sides of the second chambers 52, respectively. The gas generator 5 is located in an upper portion of the first chamber 51. Numeral 53 designates a joint line along the peripheral edges of the panels, 54 designates joint lines as linear sewn portions for defining the second chambers 52, and 55 designates partitions for narrowing the gas inlets 57.

Figure 7:
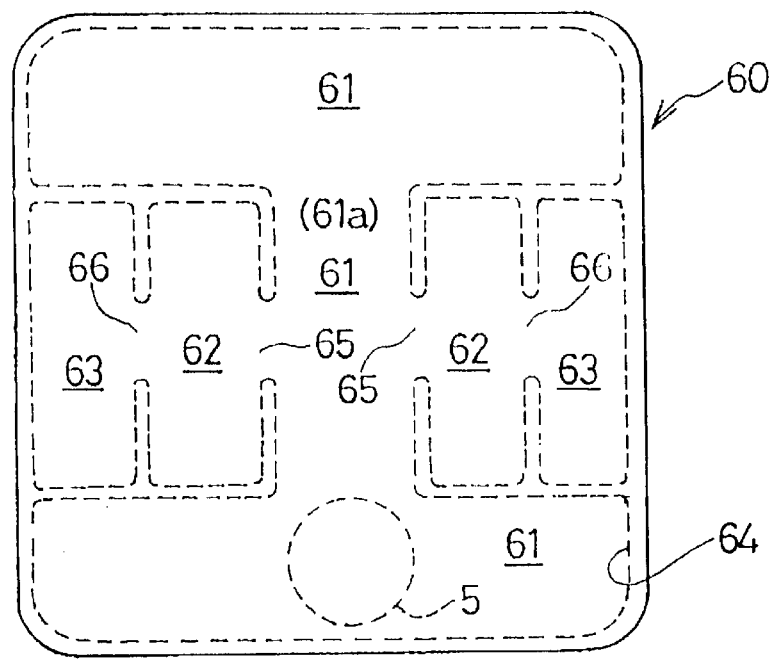
FIG. 7 is a front view of an airbag according to another embodiment.

An airbag 60 shown in FIG. 7 has a first chamber 61 extending horizontally along both upper and lower edges as well as vertically along a middle portion of the airbag. That is, the first chamber 61 is formed in an H-shape turned laterally. Second chambers 62 are arranged at both the left and right sides of the middle portion (61a) of the first chamber 61 such that each second chamber 62 extends vertically. Third chambers 63 are formed between the second chamber 62 and the left and right side edges of the airbag 60. The second chambers 62 communicate with the first chamber 61 (61a) through gas inlets 65. The third chambers 63 communicate with the second chambers 62 through gas inlets 66. The gas generator 5 is located in the first chamber 61 at a center portion of the lower edge.

Figure 8:
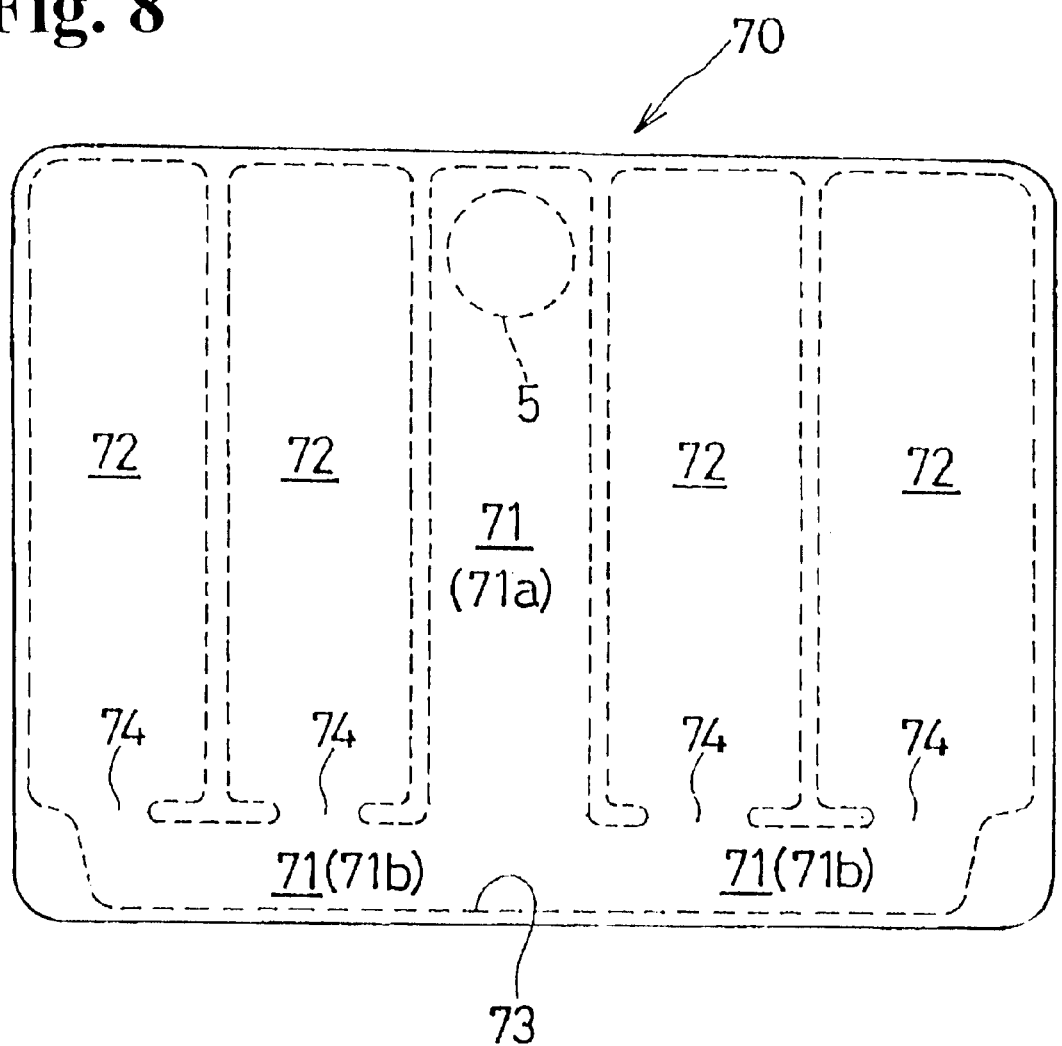
FIG. 8 is a front view of an airbag according to another embodiment.

In an airbag 70 shown in FIG. 8, a first chamber 71 has a portion (71a) extending vertically at the middle and a portion (71b) extending horizontally along a lower edge of the airbag. That is, the first chamber 71 is formed in an inverse T-shape. Second chambers 72 are arranged on both sides of the vertical portion 71a of the first chamber 71, and extend vertically. The second chambers 72 communicate with the portion 71b of the first chamber 71 through gas ports 74 formed at the bottom of each second chamber 72. The gas generator 5 is located at an upper side of the portion 71a of the first chamber 71.

Figure 9:
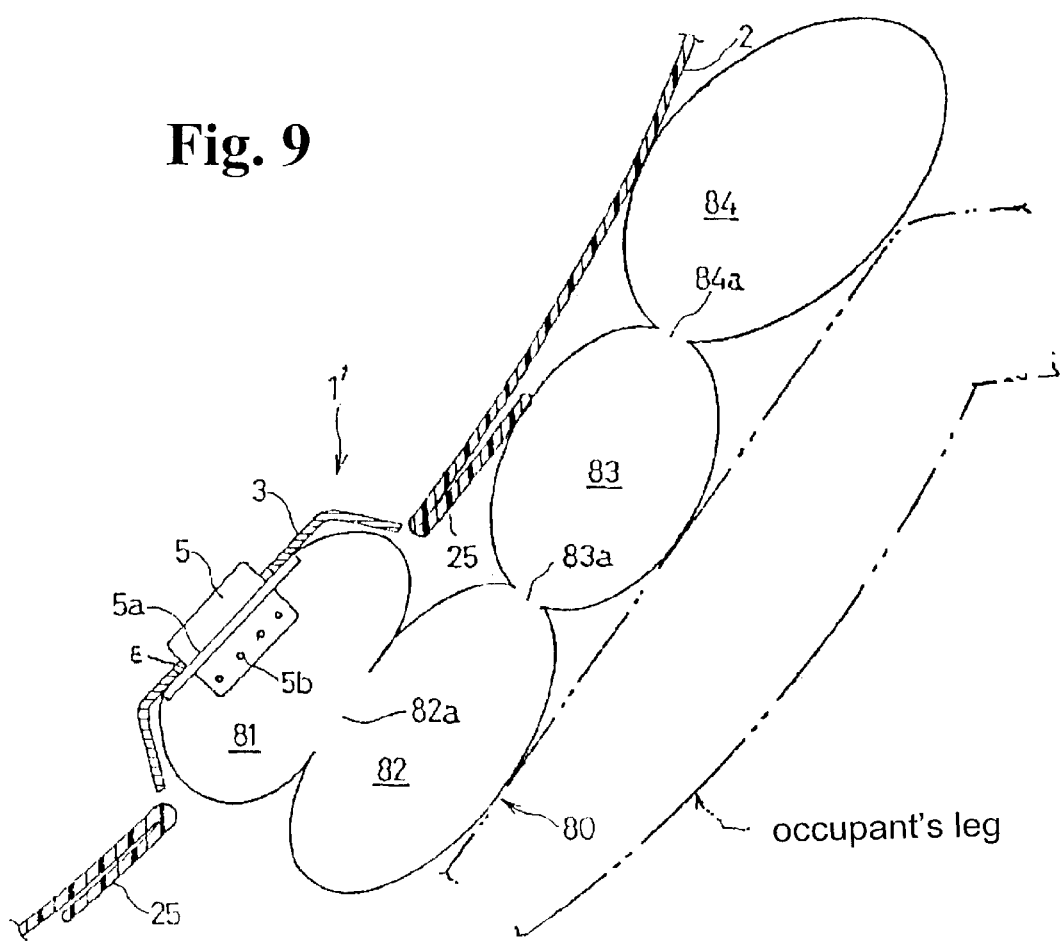
FIG. 9 is a vertical sectional view of an airbag in the inflated state of a leg protection device according to still another embodiment.

An airbag 80 of a leg protection device 1' shown in FIG. 9 comprises a first chamber 81, a second chamber 82, a third chamber 83, and a forth chamber 84. A main part of the first chamber 81 stays within the casing 3 even when the airbag 80 is fully deployed. The second chamber 82 expands in front of the first chamber 81. The third chamber 83 expands above the second chamber 82, and the fourth chamber 84 expands above the third chamber 83.

The second, third and fourth chambers 82, 83, 84 communicate with the first, second, and third chambers 81, 82, 83 through narrowed gas inlets 82a, 83a, 84a, respectively.

The third and fourth chambers 83, 84 expand along the interior panel 2. The second, third, fourth chambers 82, 83, 84 extend in a lateral direction in the inflated state. The number of the gas inlets 82a, 83a, and 84a may be one or more. The other structural features of FIG. 9 are the same as those of FIG. 3(a).

Figure 10B:
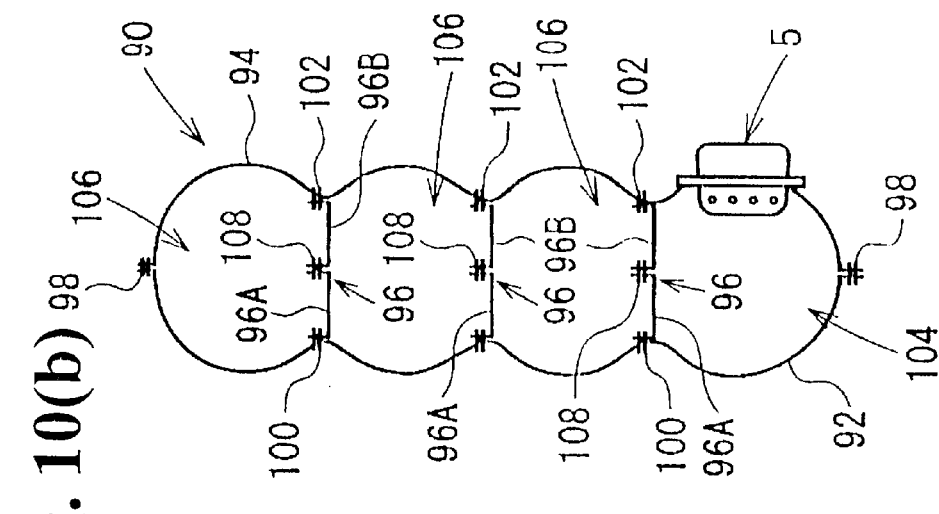
FIG. 10(b) is a vertical sectional view taken along line 10(b)—10(b) of FIG. 10(a)
Figure 10A:
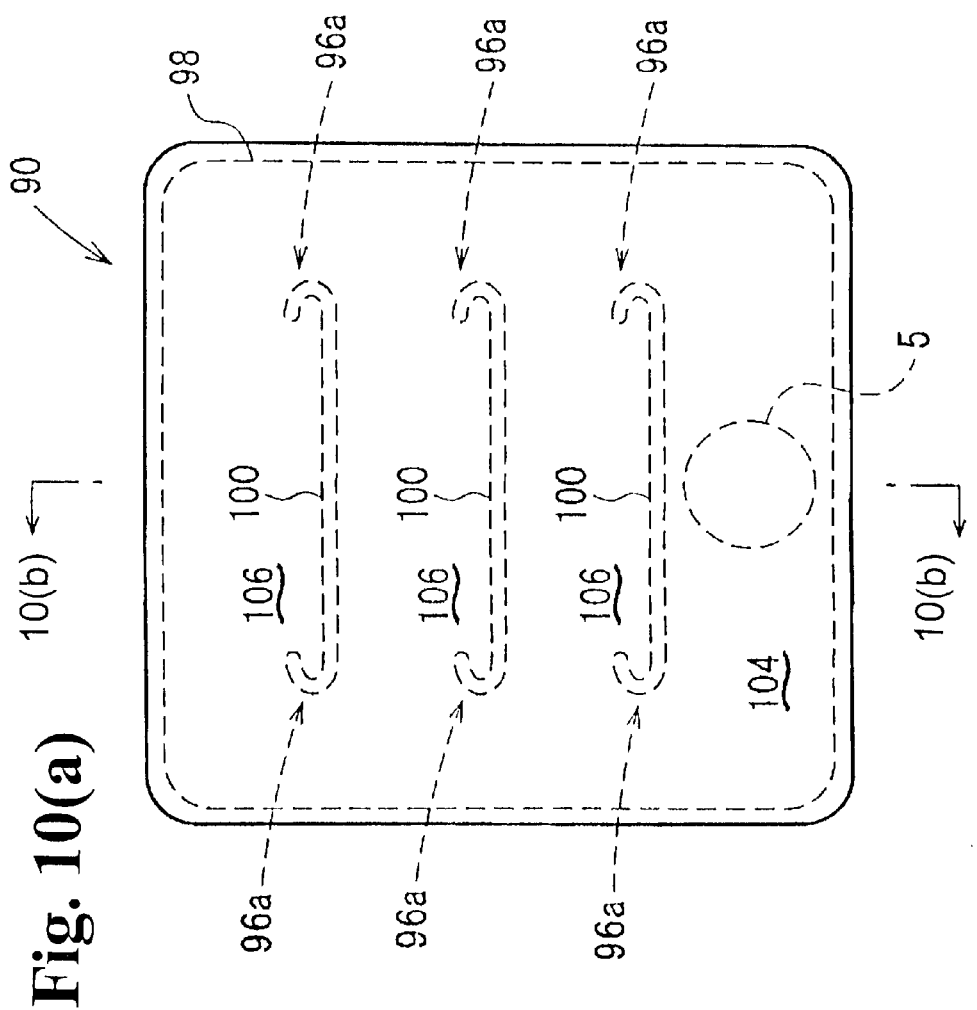
FIG. 10(a) is a front view of still another embodiment of a leg protection device.

FIG. 10(a) is a plan or front view of an airbag according to another embodiment of the present invention. FIG. 10(b) is a sectional view taken along line 10(b)—10(b) in FIG. 10(a).

As shown in FIGS. 10(a) and 10(b), this airbag 90 comprises a front panel 92 and a rear panel 94 connected to each other by three partition panels 96. The partition panels 96 are arranged such that they extend substantially parallel to each other both in the thickness direction and the vehicle-lateral direction. As shown in FIG. 10(a), the left and right ends of each partition panel 96 are spaced apart from the left and right side edges of the airbag 90, respectively. Each partition panel 96 has curved portions 96a, curved upward and formed in a J-shape, at the both ends.

In FIGS. 10(a) and 10(b), numeral 98 designates a joint line connecting the front panel 92 and the rear panel 94, 100 designates joint lines connecting the front panel 92 and the partition panels 96, and 102 designates joint lines connecting the rear panel 94 and the partition panels 96.

In this embodiment, each partition panel 96 comprises a panel half 96A in which one edge is connected to the front panel 92 and a panel half 96B in which one edge is connected to the rear panel 94. The other edges of the panel halves 96A, 96B are connected to each other by sewing yarn 108. Therefore, the length of the partition panel 96 (this length corresponds to a distance between the edges, connected to the front panel 92 and the rear panel 94, of the partition panel 96; that is, the distance between the joint lines 100 and 102; and the same is true for the following) can be suitably adjusted by adjusting the outlet seam width of the other edges of the panel halves 96A, 96B.

The inside of the airbag 90 is divided into a first chamber 104, which is formed in a U-shape extending along lower, left and right side edges of the airbag, and three second chambers 106, which are aligned in a vertical direction and extend along the upper edge of the airbag 90. The gas generator 5 is located in the first chamber 104 at a center portion of the lower edge of the airbag 90.

When the gas generator 5 is actuated, the gas is spouted out from the gas generator 5 into the first chamber 104. At this point, nearly entire gas pressure is used for inflating the first chamber 104 so that the first chamber 104 is rapidly inflated. The gas in the first chamber 104 flows substantially uniformly into the second chambers 106, whereby the respective second chambers 106 are substantially uniformly inflated. Because the inlets of the second chambers 106 are narrowed by the curved portions 96a provided on both ends of the respective partition panels 96, the gas in the second chambers 106 hardly flow back to the first chambers 104 even when the occupant's legs plunges into the chamber 106 positioned about the center of the airbag 90.

According to this airbag 90, since the partition panels 96 connect the front panel 92 and the rear panel 94 with each other, the thickness of the airbag is large when the airbag 90 is fully inflated. In addition, since the thickness of the airbag 90 when fully inflated can be adjusted by changing the length of the partition panels 96, design of the airbag can be made relatively freely.

Further, since the front panel 92 and the rear panel 94 are connected to each other by the partition panels 96, stresses, applied to connected portions between the panels 92, 94 and the partition panels 96 when the inner pressure of the airbag 90 is increased, are smaller than those in the case that the panels 92 and 94 are connected to each other directly by sewing or the like. Therefore, the panels 92, 94 may be made of a material having relatively low strength, thus reducing the manufacturing cost of the airbag 90.

Although the three partition panels 96 are used for connecting the front panel 92 and the rear panel 94 in the embodiment in FIGS. 10(a) and 10(b), the number of the partition panels may be one, two, or four, or more. A shape of the partition panel is arbitrary, and instead of the plane shape in the figure, for example, band shape partition panels may be used.

Figure 11A:
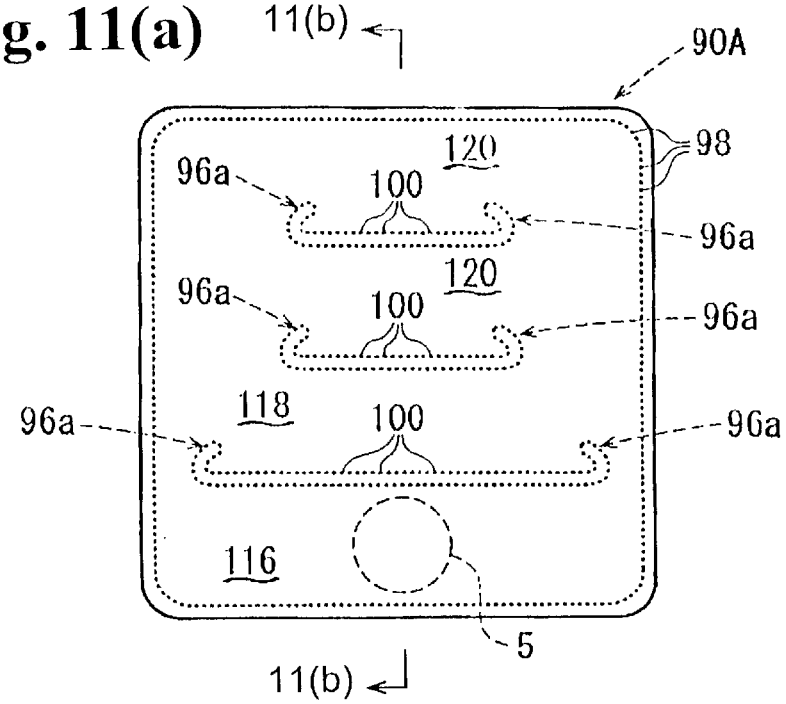
FIG. 11(a) is a front view of a further embodiment of the invention.
Figure 11B:
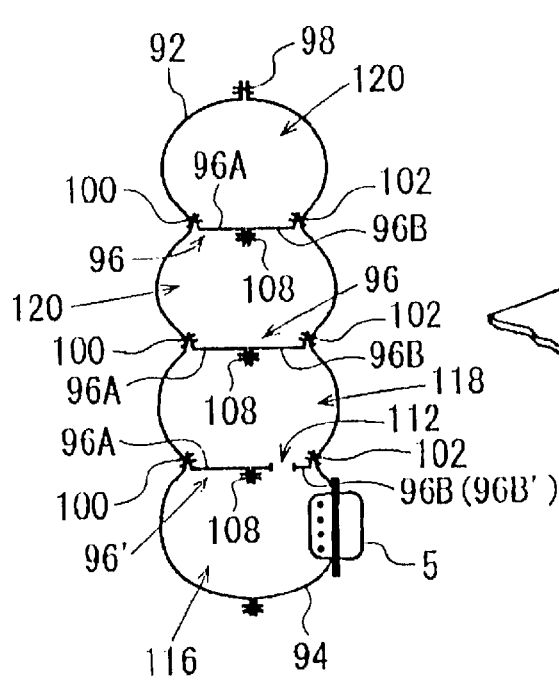
FIG. 11(b) is a sectional view takne along line 11(b)—11(b) in FIG. 11(a)
Figure 11C:
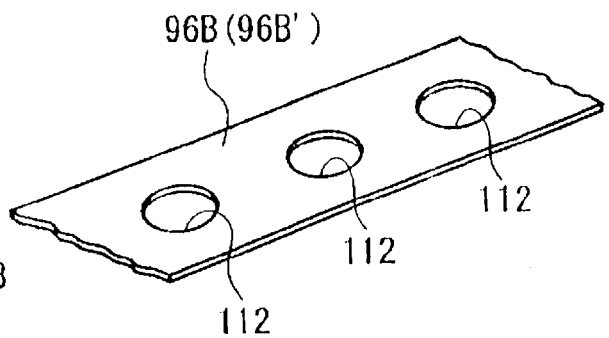
FIG. 11(c) is a perspective view of a partition panel.

As an airbag 90A shown in FIGS. 11(a)–11(c), the partition panels may be provided with vent holes (gas communication openings) so that the gas can communicate between adjacent chambers in the airbag through the vent holes. Hereinafter, this airbag 90A will be described in detail. FIG. 11(a) is a front view of the airbag 90A, and FIG. 11(b) is a sectional view taken along line 11(b)—11(b) of FIG. 11(a). FIG. 11(c) is a perspective view showing a half of the partition panel with the vent holes in an extended state.

Similarly to the airbag 90 in FIGS. 10(a) and 10(b), in the airbag 90A, the front panel 92 and the rear panel 94 are connected to each other by three partition panels 96, which are arranged to extend parallel to each other in the thickness direction and the lateral direction of the airbag 90A and arranged in lateral rows aligned in the vertical direction of the airbag 90A when the airbag 90A is inflated.

In this embodiment, as shown in FIGS. 11(b), 11(c), a panel half 96B (96B') of the lowest partition panel 96 (96') among the three partitions 96 is formed with a plurality of small vent holes 112. As shown in FIG. 11(a), the left and right ends of the lowest partition panel 96 (96') are located closer to the left and right side edges than the left and right ends of the other two partition panels 96 so that the lowest partition panel 96 (96') has curved portions 96a at positions near the left and right side edges of the airbag 90A.

In this embodiment, when the airbag 90A is inflated, the distances between the left and right ends of the partition panel 96 (96') and the left and right side edges of the airbag 90A are shortened to nearly close the path of gas, respectively, because the left and right side edges of the airbag 90A move close to each other with an increase in the thickness of the airbag 90A. However, the airbag may be designed such that the spaces therebetween remain there when the airbag 90A is inflated.

The inside of the airbag 90A is divided by these partition panels 96 into a first chamber 116 extending along the lower edge of the airbag 90A in a lateral direction, a second chamber 118 formed in a U-shape extending along the upper edge of the first chamber 116 as well as the left and right side edges of the airbag 90A, and two third chambers 120 extending along the upper edge of the airbag 90A in the lateral direction and arranged vertically parallel to each other. The gas generator 5 is situated in the first chamber 116 at the center of the lower edge of the airbag 90A.

The other structural features of the airbag 90A are the same as those of the airbag 90 in FIGS. 10(a), 10(b). Therefore, component parts in FIGS. 11(a)–11(c) corresponding to the same parts in FIGS. 10(a), 10(b) are designated with the same reference numerals, thus omitting the detail description of such component parts.

When the gas generator 5 is actuated, the gas is spouted out from the gas generator 5 into the first chamber 116. At this point, nearly entire gas pressure is used for inflating the first chamber 116 so that the first chamber 116 is rapidly inflated. The gas in the first chamber 116 flows into the second chamber 118 through the vent holes 112 formed in the partition panel 96 (96') and the both sides of the partition panel 96 (96'), whereby the second chamber 118 is inflated. In this embodiment, when the airbag 90A is inflated, it is configured that the distances between the left and right ends of the partition panel 96 (96') and the left and right side edges of the airbag 90A are shortened to nearly close the path of gas. Therefore, most of the gas from the first chamber 116 to the second chamber 118 flows through the vent holes 112, and only a small part of the gas flows through the spaces at the both sides of the partition panel 96 (96'). The gas in the second chamber 118 successively flows into the third chambers 120 to inflate the chambers 120.

In this embodiment, when the airbag 90A is inflated, the distances between the left and right ends of the partition panel 96 (96') and the left and right side edges of the airbag 90A are shortened to nearly close the path of gas. As a result, an amount of the gas flowing from the first chamber 116 to the second chamber 118 through the spaces at the both sides of the partition panel 96 (96') is limited. Therefore, the gas is easily accumulated at both side edges of the first chamber 116 so that the first chamber 116 can be rapidly inflated up to every corner. For this reason, the high-pressure and high-speed gas starts to flow into the second clamber through the vent holes 112 at a relatively earlier stage. In addition, the gas in the second chamber flows into the third chamber at a relatively earlier stage. Accordingly, the respective chambers 116–120 are inflated without a large time difference so that the airbag 90A can be inflated significantly smoothly as a whole.

Although only the half of the lowest partition panel among the partition panels is formed with the vent holes in this embodiment, the other half may also be formed with the vent holes. In addition, any partition panel may have the vent holes and all of the partition panels may be formed with the vent holes. Although a plurality of the small holes is formed as the vent holes in this embodiment as shown in FIG. 11(c), configuration, size, and the number of the vent holes are not limited thereto. The movement of the airbag during inflation can be suitably controlled by changing and adjusting the configuration, the size, and the number of the vent holes corresponding to the construction of the airbag.

With reference to FIGS. 12(a)–15(b), an embodiment in which a chamber for receiving the knees is designed to have thickness larger than those of other chambers when the airbag is inflated will be explained.

Figure 12B:
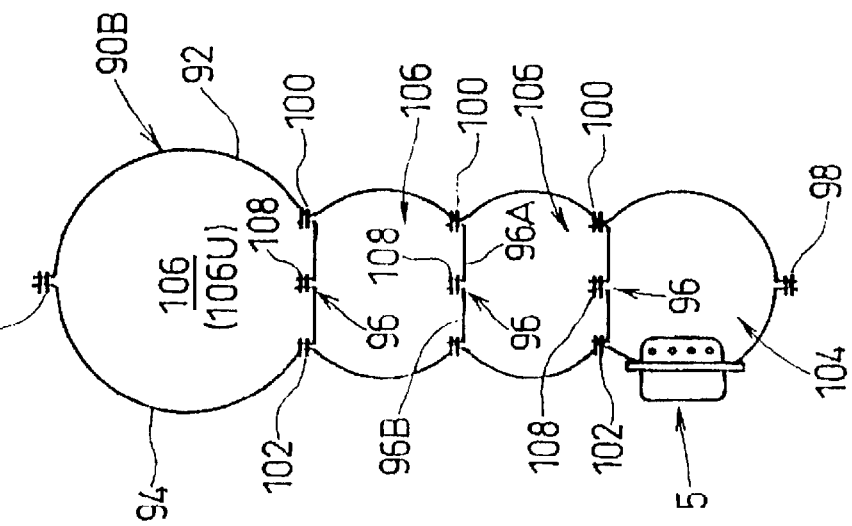
FIG. 12(b) is a sectional view taken along line 12(b)—12(b) in FIG. 12(a)
Figure 12A:
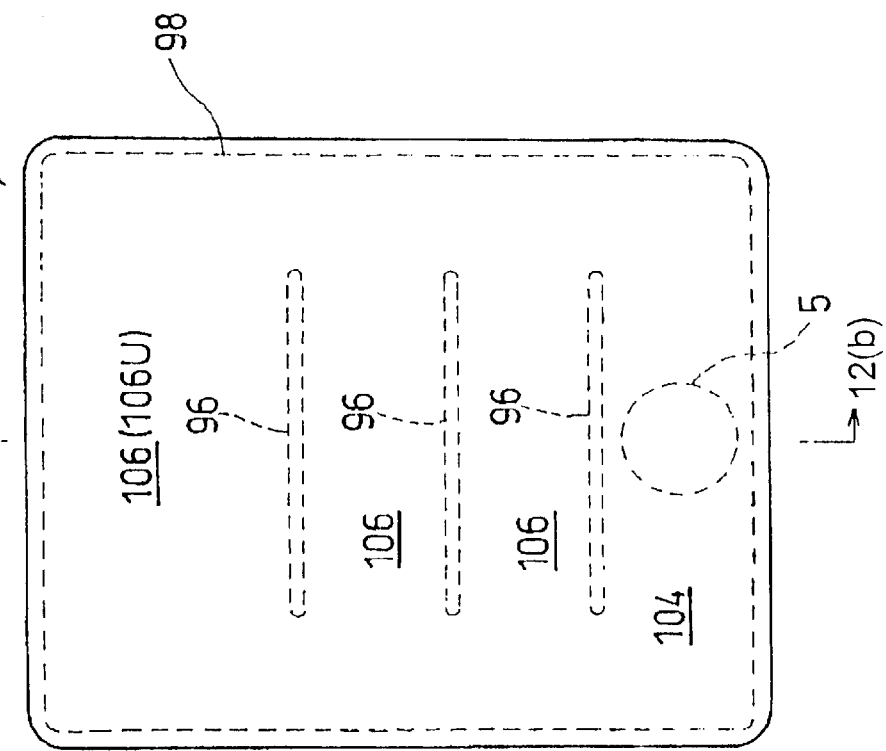
FIG. 12(a) is a front view of a still further embodiment of the invention.

FIGS. 12(a), 12(b) and FIG. 13 show the first example of the aforementioned airbag. FIG. 12(a) is a front view of the airbag, FIG. 12(b) is a sectional view taken along line 12(b)—12(b) in FIG. 12(a), and FIG. 13 is a vertical sectional view showing a state that the airbag is inflated and deployed along the interior panel.

This airbag 90B has a similar structure to that of the aforementioned airbag 90 shown in FIGS. 10(a) and 10(b). That is, the airbag 90B has a front panel 92 and a rear panel 94 connected to each other by three partition panels 96 similarly to the airbag 90. The partition panels 96 are arranged such that they extend substantially parallel to each other both in the thickness direction of the airbag 90B and the vehicle-lateral direction when the airbag 90B is inflated. Difference from the aforementioned airbag 90 is that each partition panel 96 extends in the lateral direction in a straight line.

The distance between the uppermost partition panel 96 among the three partition panels 96 and the upper edge of the airbag 90B is larger than the distance between the other partition panels and the distance between the lowest partition and the lower edge of the airbag 90B. Therefore, the uppermost second chamber 106 (106U) has a thickness larger than those of the other second chambers 106 and the first chamber 104 when inflated. The second chamber 106U is positioned at the top of the airbag 90B.

The other structural features of the airbag 90B are the same as those of the airbag 90, and the same numerals designate the same or corresponding parts.

When the gas generator 5 is actuated, the gas is spouted out from the gas generator 5 into the first chamber 104. At this point, nearly entire gas pressure is used for inflating the first chamber 104 so that the first chamber 104 is rapidly inflated. Successively, the gas in the first chamber 104 flows substantially uniformly into the second chambers 106, whereby the respective second chambers 106 are substantially uniformly inflated.

According to this airbag 90B, the uppermost second chamber 106U is inflated and deployed near and above a front portion extended from a seating surface of the seat. Accordingly, the uppermost second chamber 106U can be inflated and deployed near a front portion of the knees of the occupant, thereby receiving the knees and absorbing the impact on the knees and the thigh joints.

In this embodiment, as an airbag 90B' shown in FIG. 16, the airbag may be designed to have thickness gradually increasing from a bottom to a top when inflated by selecting lengths and positions of the partition panels. It should be noted that a line FL in FIG. 16 schematically indicates an outer line of a surface of the airbag 90B' opposing to the occupant. The distance between the line FL and the interior panel 2 increases upwardly.

Although the three partition panels 96 are used for connecting the front panel 92 and the rear panel 94 in the embodiments of FIGS. 12(a), 12(b), FIG. 13, and FIG. 16, the number of the partition panels may be one, two or four, or more.

As an airbag 90C shown in FIGS. 14(a)–14(c), tethers (belts) 140 may be provided in the uppermost second chamber 106U for connecting the front panel 92 and the rear panel 94. Here, FIG. 14(a) is a front view of the airbag 90C, and FIGS. 14(b), 14(c) are sectional views taken along line 14(b)—14(b) and line 14(c)—14(c) in FIG. 14(a), respectively.

Because of the tethers 140, the thickness of the uppermost second chamber 106U when inflated can be prevented from being too large. Though two tethers 140 are used in FIGS. 14(a), 14(b), and 14(c), one or more than three tethers may be used.

Figure 15B:
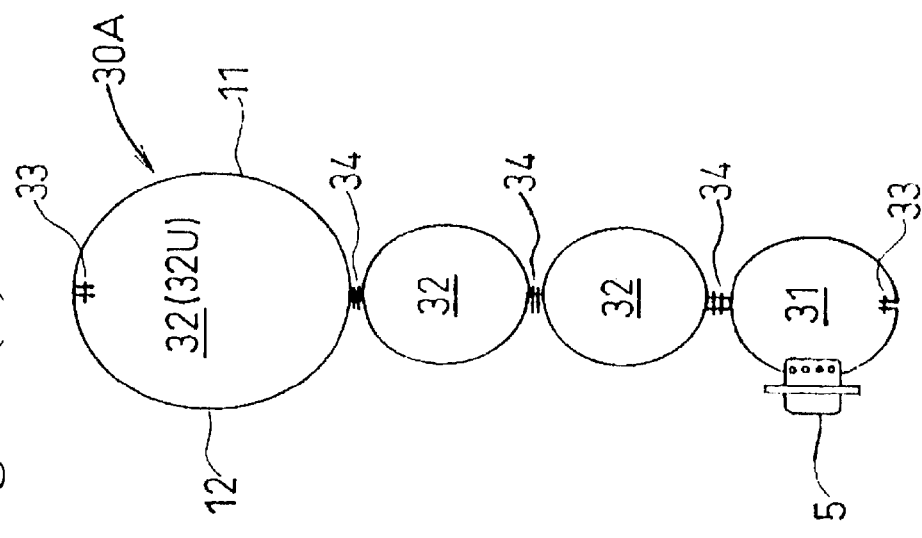
FIG. 15(b) is a sectional view taken along line 15(b)—15(b) in FIG. 15(a)
Figure 15A:
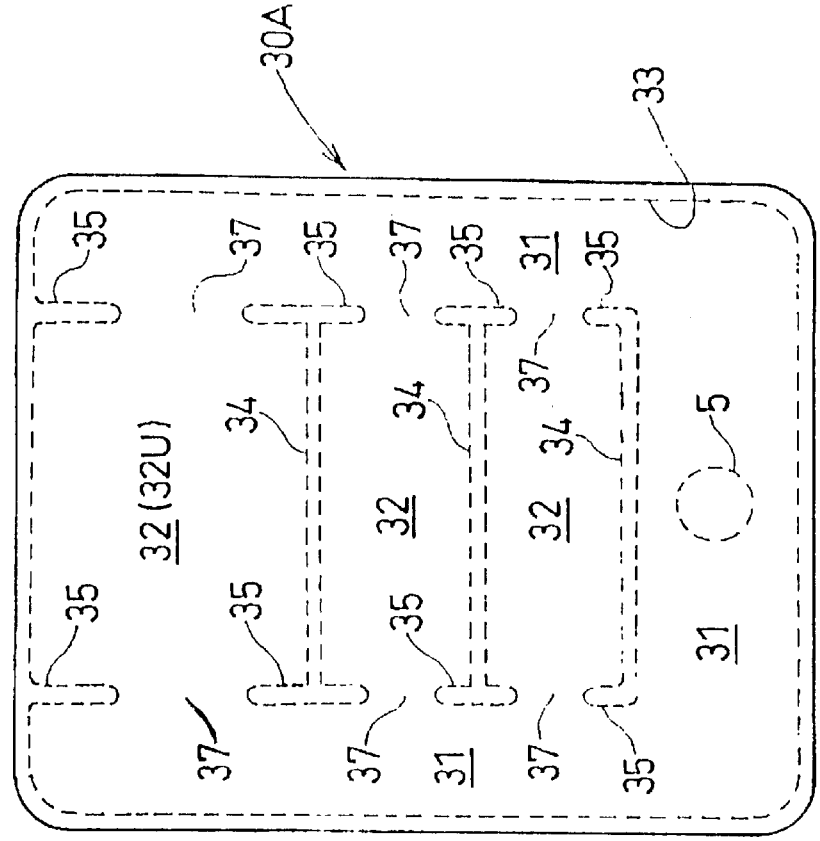
FIG. 15(a) is a front view of a still further embodiment of the invention.

FIGS. 15(a) and 15(b) show an airbag 30A similar to the aforementioned airbag 30 in FIG. 4. The airbag 30A is different in that the uppermost second chamber 32 (32U) has thickness larger than those of the other second chambers 32 and that of a first chamber 31 when inflated. FIG. 15(a) is a front view of the airbag 30A and FIG. 15(b) is a sectional view taken along line 15(b)—15(b) of FIG. 15(a).

The airbag 30A comprises a front panel 11 arranged to face the occupant and a rear panel 12 arranged at back. The rear panel 12 is provided with an insertion hole (without numeral) for the gas generator 5.

These panels 11, 12 are joined linearly along their peripheries to make them into an envelope shape. Numeral 33 designates a joint line for the joint along the peripheries.

Similarly to the airbag 30 of FIG. 4, this airbag 30A has the first chamber 31 formed in a U-shape extending along lower, left and right side edges of the airbag. The gas generator 5 is located in the first chamber 31 at a center portion of the lower edge. The second chambers 32 extend in a lateral direction. Each second chamber 32 has gas inlets 37 at both lateral sides. Numeral 34 designates joint lines as linear sewn portions for defining the second chambers 32, and 35 designates partitions for narrowing the inlets 37. It should be noted that the partitions 35 may be omitted.

The airbag 30A is provided with a plurality of second chambers 32. Among them, the uppermost second chamber 32 is located at the top of the airbag 30A. The distance between the joint line 34 and the top edge of the airbag 30A is larger than the distance between the adjacent joint lines 34 and larger than the distance between the joint line 34 and the lower edge of the airbag 30A. Therefore, the uppermost second chamber 32U has a thickness larger than the thicknesses of the other second chambers 32 and the first chamber 31 when inflated.

According to this airbag 30A, the uppermost second chamber 32U is inflated and deployed at a space in front of the knees of the occupant, thereby receiving the knees.

Figure 17:
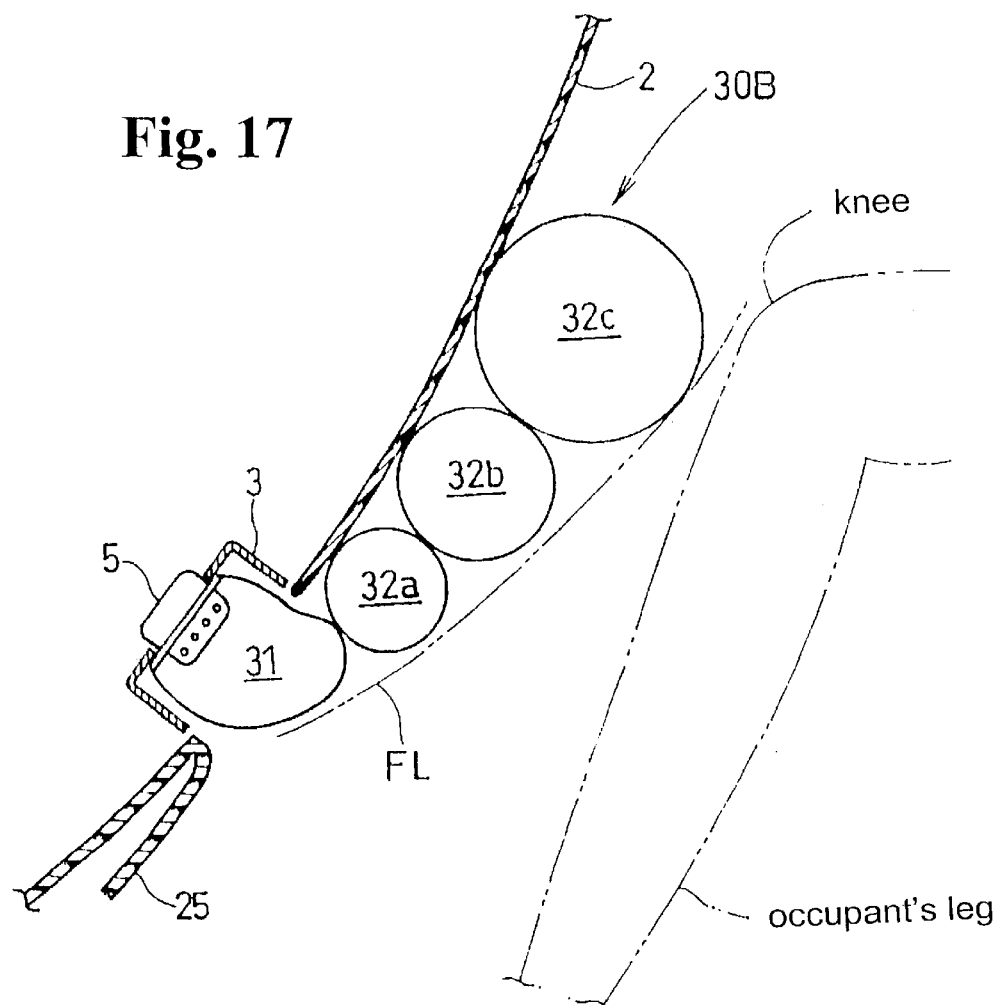
FIG. 17 is a view showing an airbag according to another embodiment.

Also in this embodiment, as an airbag 30B shown in FIG. 17, the airbag may be designed to have thickness gradually increasing from a bottom to a top when inflated so that the distance between the outer line FL and the interior panel 2 increases toward the top.

Although the leg protection device is installed in the interior panel 2 in the aforementioned embodiments, the device may be installed in a glove box. The joint along the joint lines may be formed by adhesive or a combination of sewing yarns and adhesive, besides only by sewing yarns.

As described above, the leg protection device for the vehicle occupant of the present invention has the airbag in which the thickness thereof when inflated is small, whereby the airbag can be rapidly inflated even with the gas generator having a small gas generating capacity. The leg protection device can sufficiently receive and stop the occupant's legs even with the airbag having a small thickness when inflated.

While the invention has been explained with reference to the specific embodiments of the invention, the explanation is illustrative and the invention is limited only by the appended claims.

What is claimed is:

1. A leg protection device for protecting legs of a vehicle occupant from a member in front of the vehicle occupant, comprising:

a gas generator to be attached to the vehicle for generating gas, and an airbag attached to the gas generator for receiving the gas therefrom for inflation and having a substantially rectangular shape, said airbag including a first chamber extending laterally at a lower side thereof and having a first gas inlet in a center area thereof to receive the gas from the gas generator, two lateral side areas extending from two lateral sides of the first chamber along the airbag, and a plurality of second chambers extending parallel to the first chamber between the two lateral side areas, each second chamber having second gas inlets communicating with the two lateral side areas so that when the gas generator is actuated, the gas enters the first chamber, flows along the two lateral sides and enters the second chambers sequentially to thereby inflate the airbag.

2. The leg protection device according to claim 1, wherein said airbag further includes partitions at the second gas inlets so that each of the second gas inlets has a size smaller than that of the second chamber adjacent thereto.

3. The leg protection device according to claim 2, wherein said partitions extend substantially perpendicular to the second chambers.

4. The leg protection device according to claim 2, wherein said partitions are curved to extend inwardly of the second chambers.

5. The leg protection device according to claim 4, wherein one of the second chambers adjacent to the first chamber is longer in a lateral size than other second chambers.

6. The leg protection device according to claim 1, wherein one of the second chambers away from the first chamber has a width size perpendicular to the lateral size greater than those of other second chambers.

7. The leg protection device according to claim 6, wherein said airbag further includes partitions at the second gas inlets so that each of the second gas inlets has a size smaller than that of the second chamber adjacent thereto.

8. The leg protection device according to claim 6, wherein said width sizes of the second chambers gradually increase from the second chamber adjacent to the first chamber to the second chamber away from the first chamber.

9. The leg protection device according to claim 8, wherein said air bag extends upwardly from the gas generator.

10. A leg protection device for protecting legs of a vehicle occupant from a member in front of the vehicle occupant, comprising:

a gas generator to be attached to the vehicle for generating gas, and an airbag attached to the gas generator for receiving the gas therefrom for inflation and having a substantially rectangular shape, said airbag including a first chamber extending vertically at a middle thereof and having a first gas inlet in a center area thereof to receive the gas from the gas generator, and a plurality of second chambers extending parallel to each other perpendicularly to the first chamber and located at two lateral sides relative to the first chamber, each second chamber having a second gas inlet communicating with the first chamber so that when the gas generator is actuated, the gas enters the first chamber, and flows into the second chambers to thereby inflate the airbag.

11. The leg protection device according to claim 10, wherein said airbag further includes partitions at the second gas inlets so that each of the second gas inlets has a size smaller than that of the second chamber adjacent thereto.

12. The leg protection device according to claim 11, wherein said partitions extend substantially perpendicular to the second chambers.

* * * * *